(12) United States Patent
Yamamaru et al.

(10) Patent No.: US 9,321,363 B2
(45) Date of Patent: Apr. 26, 2016

(54) CHARGING PORT LID FOR AN ELECTRIC VEHICLE HAVING A FIRST STRIKING PART CONTACTING A LOCATION ON A CHARGING GUN OTHER THAN ITS UNLOCKING OPERATION PART

(71) Applicant: Nissan Motor Co., Ltd., Yokohama-shi, Kanagawa (JP)

(72) Inventors: Junichi Yamamaru, Ebina (JP); Kyouhei Kawasaki, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/419,251

(22) PCT Filed: Aug. 29, 2013

(86) PCT No.: PCT/JP2013/073225
§ 371 (c)(1),
(2) Date: Feb. 3, 2015

(87) PCT Pub. No.: WO2014/045831
PCT Pub. Date: Mar. 27, 2014

(65) Prior Publication Data
US 2015/0183331 A1   Jul. 2, 2015

(30) Foreign Application Priority Data

Sep. 19, 2012   (JP) ................................. 2012-205873

(51) Int. Cl.
*H01R 33/00* (2006.01)
*B60L 11/18* (2006.01)
(Continued)

(52) U.S. Cl.
CPC ............. *B60L 11/1818* (2013.01); *B60K 15/05* (2013.01); *B60L 11/185* (2013.01);
(Continued)

(58) Field of Classification Search
CPC ............... H01R 13/62; H01R 13/6205; H01R 13/6271; H01R 13/6272
USPC ....................... 439/34, 35, 299, 310, 488, 490
See application file for complete search history.

(56) References Cited

U.S. PATENT DOCUMENTS 3,270,267 A * 8/1966 Nolte, Jr. ............... H02J 7/0042
                                                        200/51.09
5,458,496 A * 10/1995 Itou ..................... B60L 11/1846
                                                           439/34
(Continued)

FOREIGN PATENT DOCUMENTS

CN       102101444 A       6/2011
CN       102458908 A       5/2012
(Continued)

*Primary Examiner* — Chandrika Prasad
(74) *Attorney, Agent, or Firm* — Global IP Counselors, LLP

(57) ABSTRACT

An external charging structure for an electric vehicle is provided with a normal charging port to be connected with a charging gun, and a charging port lid that closes when charging is not occurring to cover an opening of a port chamber where the normal charging port is disposed and opens when charging is occurring to ensure an open space allowing a port connection with the charging gun. In the external charging structure of the electric vehicle, the charging gun has a locking part for holding a port coupling in a position of electrical connection, and an unlocking operation part placed projecting from a surface of the gun and used for unlocking by a push operation. A first-striking part is disposed on a rear surface of the charging port lid, the first-striking part coming in contact with a location other than the unlocking operation part ahead of where contact would be made with the unlocking operation part when the charging port lid is closed toward the charging gun during charging.

10 Claims, 8 Drawing Sheets

(51) Int. Cl.
   *H01R 13/627*   (2006.01)
   *B60K 15/05*   (2006.01)
   *B60K 1/04*   (2006.01)

(52) U.S. Cl.
   CPC ....... *B60L 11/1877* (2013.01); *H01R 13/6272* (2013.01); *B60K 2001/0438* (2013.01); *B60K 2015/053* (2013.01); *B60K 2015/0576* (2013.01); *B60L 2270/30* (2013.01); *B60L 2270/32* (2013.01); *Y02T 10/7005* (2013.01); *Y02T 10/705* (2013.01); *Y02T 90/121* (2013.01); *Y02T 90/128* (2013.01); *Y02T 90/14* (2013.01)

(56) References Cited

U.S. PATENT DOCUMENTS

| | | | | |
|---|---|---|---|---|
| 5,906,500 | A * | 5/1999 | Kakuta | B60L 11/1818 439/310 |
| 6,123,569 | A * | 9/2000 | Fukushima | B60L 11/1818 439/310 |
| 7,972,167 | B2 * | 7/2011 | Amit | B60L 11/005 439/456 |
| 8,414,339 | B1 * | 4/2013 | Glick | H01R 13/187 439/357 |
| 8,890,475 | B1 * | 11/2014 | Becker | B60L 11/1827 180/65.29 |
| 2009/0079389 | A1 | 3/2009 | Ohtomo | |
| 2011/0065305 | A1 | 3/2011 | Amit et al. | |
| 2011/0254504 | A1 * | 10/2011 | Haddad | B60L 11/1827 320/109 |
| 2013/0193921 | A1 * | 8/2013 | George | B60L 11/1824 320/109 |
| 2015/0151645 | A1 * | 6/2015 | Yamamaru | B60L 11/185 320/109 |
| 2015/0183331 | A1 * | 7/2015 | Yamamaru | B60K 15/05 701/22 |

FOREIGN PATENT DOCUMENTS

| | | |
|---|---|---|
| DE | 3209007 C1 | 8/1983 |
| EP | 1449702 B1 | 6/2008 |
| JP | 2010-288363 A | 12/2010 |
| JP | 2011-126459 A | 6/2011 |
| JP | 2012-79503 A | 4/2012 |
| JP | 2012-236457 A | 12/2012 |
| JP | 2012-240645 A | 12/2012 |
| WO | 2010/060370 A1 | 6/2010 |
| WO | 2010/143040 A1 | 12/2010 |
| WO | 2012/053221 A1 | 4/2012 |

* cited by examiner

CHARGING PORT LID FOR AN ELECTRIC VEHICLE HAVING A FIRST STRIKING PART CONTACTING A LOCATION ON A CHARGING GUN OTHER THAN ITS UNLOCKING OPERATION PART

CROSS-REFERENCE TO RELATED APPLICATIONS

This application is a U.S. National stage application of International Application No. PCT/JP2013/073225, filed Aug. 29, 2013, which claims priority to Patent Application 2012-205873 published by the Japanese Patent Office on Sep. 19, 2012, the contents of each of which are hereby incorporated herein by reference.

BACKGROUND

1. Field of the Invention

The present invention relates to an external charging structure for an electric vehicle, the external charging structure being provided with a charging port to which a charging gun is connected when a vehicle-mounted battery is charged.

2. Background Information

There is known in the art a lid opening and closing structure for charging port, in which two charging ports are placed on a front part of a vehicle body, and the two charging ports are covered by a lid that rotates vertically to be capable of opening and closing (see, for example, Japanese Laid-Open Patent Application No. 2010-288363).

SUMMARY

However, the charging gun connected to the charging port disclosed in Japanese Laid-Open Patent Application No. 2010-288363 includes a charging gun lock mechanism having a locking part for holding a coupling in a position where the charging gun is connected with the charging port, and an unlocking operation part placed projecting from the surface of the gun and used for unlocking the unlocking part by a push operation.

A problem is accordingly presented in that when an operation to close the charging port lid toward the charging gun is performed during charging with the charging gun connected to the charging port, the unlocking operation part might be pushed and the locking part released upon contacting of the unlocking operation part of the charging gun with the lid rear surface, and the charging operation using the electrical connection might be interrupted.

The present invention was created in view of the above problem, and an object thereof is to provide an external charging structure for electrical vehicle, by which unlocking of the charging gun by the charging port lid can be prevented even when the charging port lid is closed toward the charging gun.

In order to achieve the abovementioned object, the external charging structure for an electric vehicle of the present invention includes a charging port to which a charging gun is connected when a vehicle-mounted battery is charged, and a charging port lid that closes when charging is not occurring to cover an opening of a port chamber where the charging port is disposed and opens when charging is occurring to ensure an open space allowing a port connection with the charging gun.

In this external charging structure for an electric vehicle:
the charging gun has a locking part for holding a coupling in a position where the charging gun is connected with the charging port, and an unlocking operation part placed projecting from a surface of the gun and used for unlocking the locking part by a push operation in a closing direction of the charging port lid.

A first-striking part is provided on a rear surface of the charging port lid, the first-striking part coming in contact with a location other than the unlocking operation part ahead of where contact would be made with the unlocking operation part when the charging port lid is closed in a closing direction of the charging port lid.

The first-striking part disposed on the rear surface of the charging port lid thereby comes in contact with the location other than the unlocking operation part ahead of where contact would be made with the unlocking operation part when the charging port lid is closed toward the charging gun during charging.

Accordingly, the contact of the first-striking part of the charging port lid with the location other than the unlocking operation part is maintained, and unlocking of the charging gun by pushing of the unlocking operation part by the rear surface of the charging port lid is prevented, even when an operation to close the charging port lid toward the charging gun during charging is performed. As a result, unintentional interruption of the charging operation accompanying unlocking is avoided.

A configuration is thus adopted, in which, when the lid closing direction and the release direction of the unlocking operation part are the same, as a countermeasure against unlocking by a lid-closing operation during charging, the first-striking part coming in contact with the location other than the unlocking operation part ahead of where contact would be made with the unlocking operation part is provided in advance on the rear surface of the charging port lid. Therefore, unlocking of the charging gun by the charging port lid can be prevented even when the charging port lid is closed toward the charging gun during charging.

BRIEF DESCRIPTION OF THE DRAWINGS

Referring now to the attached drawings which form a part of this original disclosure.

DETAILED DESCRIPTION OF EMBODIMENTS

Figure 1:
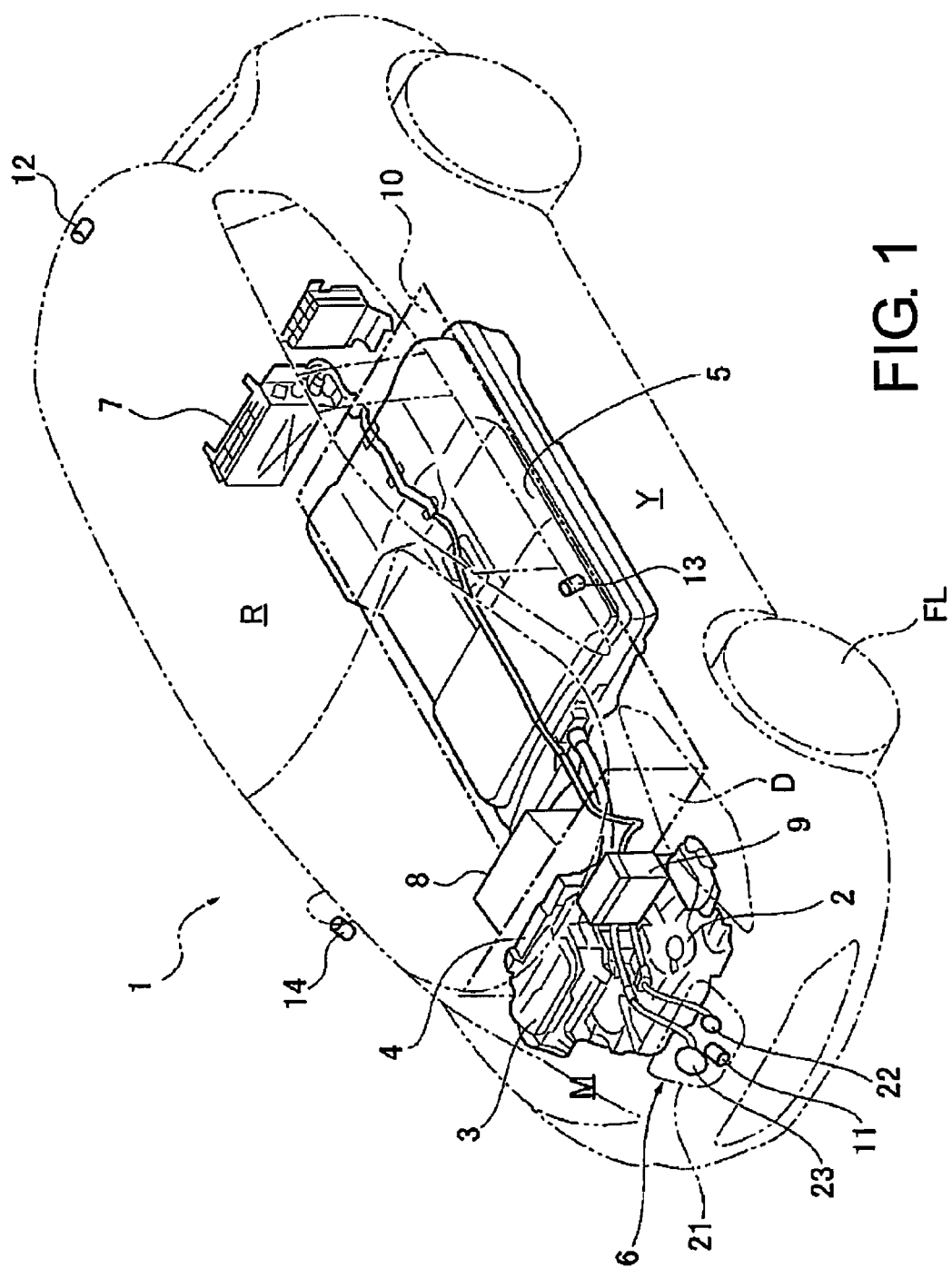
FIG. 1 is an overall perspective view illustrating the main parts of an electric vehicle (one example of an electric vehicle) in which the external charging structure of embodiment 1 is applied.

A preferred embodiment of the external charging structure for an electric vehicle of the present invention is described below based on embodiment 1 and embodiment 2 illustrated in the drawings.

Embodiment 1

The configuration of the external charging structure for an electric vehicle of embodiment 1 is described below under the headings: "Overall configuration of electric vehicle," "Configuration of front part of body of electric vehicle," and "Detailed configuration of external charging structure."

Overall Configuration of Electric Vehicle

FIG. 1 illustrates the general configuration of a sedan-type electric vehicle (one example of an electric vehicle) in which the external charging structure of embodiment 1 is applied. The overall configuration of the electric vehicle is described below with reference to FIG. 1.

The electric vehicle 1 to which the external charging structure of embodiment 1 is applied is provided with a drive motor 2, a drive motor inverter 3, a DC/DC junction box 4, a battery pack 5, an external charging unit 6, a vehicle-mounted charger 7, an air conditioning unit 8, and a 12-volt vehicle-mounted battery 9, as illustrated in FIG. 1.

The drive motor 2 is a traveling drive source having a speed reducer, and is disposed in a motor compartment M provided in the front part of the vehicle. An output shaft, not shown, of the drive motor 2 is connected to left and right front wheels (only the left front wheel FL is shown), which are drive wheels. When a positive torque instruction is outputted to the drive motor inverter 3, the drive motor 2 performs a drive operation to generate drive torque using power discharged from the battery pack 5, and drives the left and right front wheels (electrically powered travel). Meanwhile, when a negative torque instruction is outputted to the drive motor inverter 3, the drive motor 2 performs a power generation operation to convert rotational energy from the left and right front wheels to electrical energy, and uses the generated power as power for charging the battery pack 5 (regeneration).

The DC/DC junction box 4 internally has a DC/DC converter, and distributes high-voltage power discharged from the battery pack 5, supplies power to a 12-volt power source system, and charges the 12-volt vehicle-mounted battery 9. The DC/DC junction box 4 also has a normal charging relay and a high-speed charging relay, and is capable of switching the charging circuit in tune with the charging mode.

The battery pack 5 is disposed in a below-floor space Y below a floor panel F and in a middle position of the wheelbase. The battery pack 5 serves as a power source of the drive motor 2 and also serves as a power source of the air conditioning unit 8.

The external charging unit 6 is a unit to be connected with a charging gun from a charging stand, home charging equipment, or other extravehicular power source to perform external charging, and is provided in a middle position at the front of the vehicle, and is covered by a charging port lid 21 to be capable of opening and closing. A normal charging port 22 and a high-speed charging port 23 are provided as charging ports. The normal charging port 22 is a charging port used when charging using home charging equipment, a normal charging stand, or the like, and is connected by a harness to the DC/DC junction box 4 by way of the vehicle-mounted charger 7. The high-speed charging port 23 is a charging port used when charging using a high-speed charging stand, and is connected by a harness to the DC/DC junction box 4.

The air conditioning unit is disposed above the floor panel 10, in other words, in the cabin R, and is disposed further toward the front of the vehicle than the battery pack 5. Here, the air conditioning unit is disposed between a dashboard panel D partitioning the motor compartment M and the cabin R, and an instrument panel not shown. The air conditioning unit 8 forces into the cabin R temperature-conditioned air being temperature-conditioned to a set temperature.

The external charging structure of embodiment 1 is applied to an electric vehicle 1 in which a monitor camera 11 for capturing images to the front of the vehicle, among a plurality of monitor cameras 11, 12, 13, and 14 used in a surround-view monitor system, is installed on the charging port lid 21. By "surround-view monitor system" is meant a system in which video images obtained through ultra-wide-angle lenses on the monitor cameras 11, 12, 13, 14 installed on the front, rear, left, and right of the vehicle are synthesized, and the surroundings of the vehicle are displayed in real time in a visually discernible manner on a monitor on an instrument panel. This system is used to perform, for example, a parking support function by which a positional relationship between a parking frame on a road surface and the host vehicle is monitored and displayed to facilitate parking in a parking space. The detailed configuration of an external charging structure including a structure installing a monitor camera 11 is to be described later.

Configuration of Front Part of Body of Electric Vehicle

Figure 2:
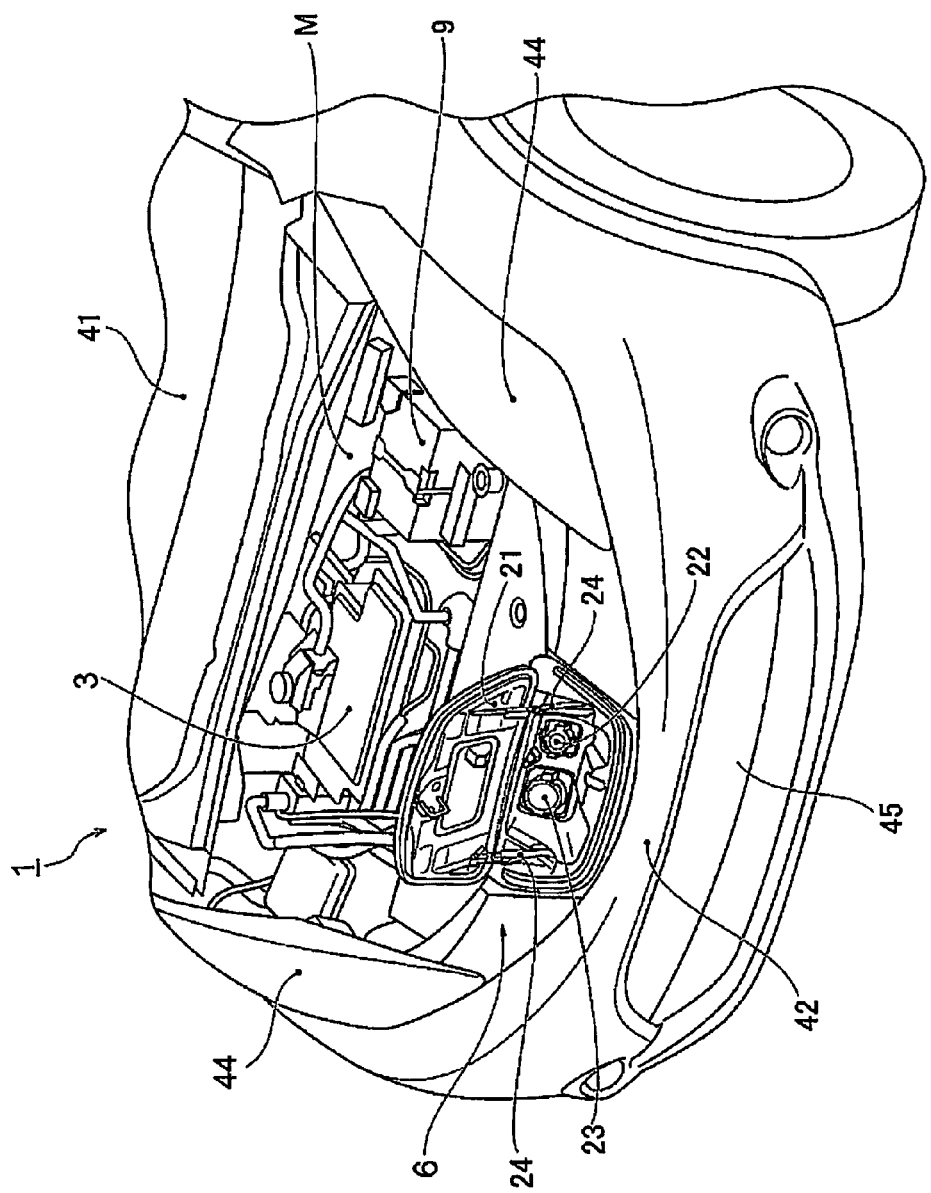
FIG. 2 is a perspective view illustrating the front part of the body of the electric vehicle in which the external charging structure of embodiment 1 is applied.
Figure 3:
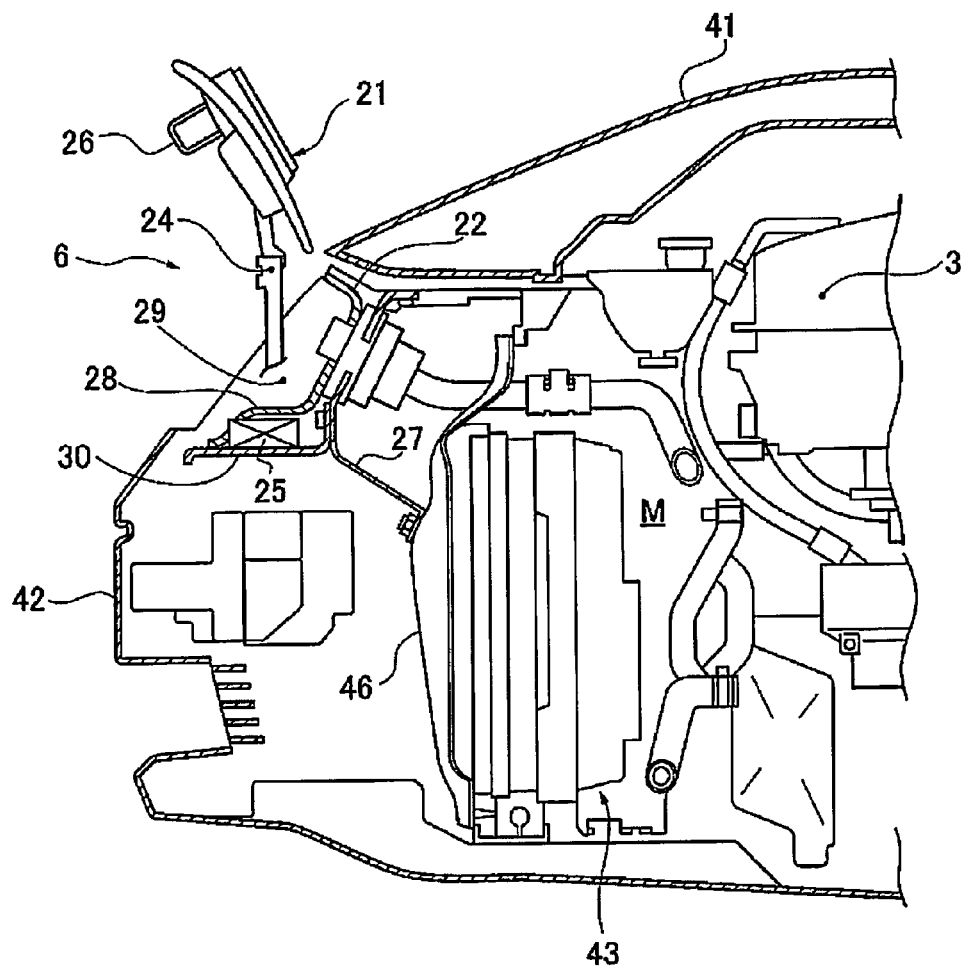
FIG. 3 is a vertical sectional view illustrating the front part of the body of the electric vehicle in which the external charging structure of embodiment 1 is applied.

FIGS. 2 and 3 are a perspective view and a vertical sectional view illustrating the front part of the body of the electric vehicle in which the external charging structure of embodiment 1 is applied. The configuration of the front part of the body of the electric vehicle is described below with reference to FIGS. 2 and 3.

A front hood 41, a front bumper 42, and the external charging unit 6 are disposed in the front part of the electric vehicle 1 of embodiment 1, as illustrated in FIGS. 2 and 3.

The front hood 41 is disposed in a position above the front part of the body to be capable of opening and closing in the vertical direction (FIG. 2: hood open, FIG. 3: hood closed). A front-end module 43, or the like, consolidating the drive motor inverter 3, 12-volt vehicle-mounted battery 9, and a heat exchanger or fan, is disposed in the motor compartment M formed in the closed state of the front hood 41.

The front bumper 42 is formed as a body part combining a fender at a position below the front part of the body and integrally extending from both sides toward the rear of the vehicle. A pair of headlight units 44, 44 on the left and right and an air intake 45, or the like, are formed on the front bumper 42, air being introduced into the front-end module 43 during travel.

The charging port unit 6 is disposed in a position in the middle of the vehicle width direction between the front hood 41 and the front bumper 42. The charging port unit 6 includes the charging port lid 21, the normal charging port 22, and the high-speed charging port 23.

The charging port lid 21 is disposed on the body to be capable of opening and closing in the vertical direction by way of left and right opening and closing arm mechanisms 24 and 24, and is disposed in a position further toward the top of the vehicle than the front bumper 42 provided on the front part of the vehicle, and in a position further toward the rear of the vehicle than the front bumper 42, as illustrated in FIG. 3. A striker 26 that is locked and secured by a lid lock mechanism 25 in the closed state of the lid is provided on the rear surface side of the charging port lid 21.

The normal charging port 22 and the high-speed charging port 23 are fixed in a row in the vehicle width direction to a port support member 27 fixed by bolt to a narrow-width center support member 46 disposed in the vertical direction in the middle of the vehicle width direction of the front-end module 33, as illustrated in FIG. 3. The port leading ends of the normal charging port 22 and the high-speed charging port 23 are disposed in a row in the vehicle width direction in a port chamber 29 formed by a port cover 28 assembled from the outside, and a charging gun 50 (see FIG. 8) is inserted and fixed into the port leading end during charging. The lid lock mechanism 25 is disposed on a port bracket 30 fixed to the port support member 27.

Detailed Configuration of the External Charging Structure

FIGS. 4 to 8 illustrate the detailed configuration of the external charging structure. The detailed configuration of the external charging structure is described below with reference to FIGS. 4 to 8.

The external charging structure of embodiment 1 includes the lid lock mechanism 25, the charging port lid 21, and the monitor camera 11, as illustrated in FIGS. 4 to 8. That is, the external charging structure is in an example of a surround-view monitor system in which the monitor camera 11 for capturing images of the periphery to the front of the vehicle is installed on the charging port lid 21.

Figure 4:
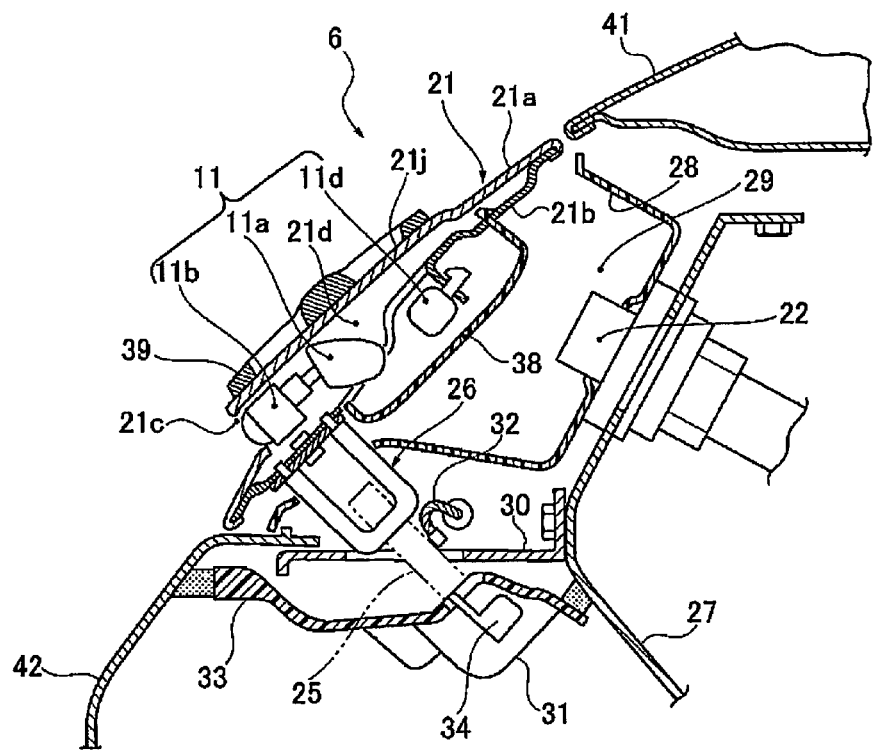
FIG. 4 is a vertical sectional view illustrating the configuration of the surrounding parts centered on the charging port in which the external charging structure of embodiment 1 is disposed.

The lid lock mechanism 25 is provided on the port bracket 30 and is a mechanism for closing and locking, constraining the striker 26 in the fully closed position when the charging port lid 21 is closed. The lid lock mechanism 25 is unlocked by outputting an instruction to an electric actuator 31 by switch operation or remote operation so that a wire 32 is drawn by a motor, as illustrated in FIG. 4. A manual unlocking lever 34 projecting from an opening on a port housing 33 is provided on the lid lock mechanism 25 to ensure unlocking by manual operation in the event of failure of the unlocking control system.

The charging port lid 21 is a lid for covering so as to be capable of opening and closing the normal charging port 22 and the high-speed charging port 23 disposed on the front part of the vehicle and in a position in the middle of the vehicle width direction. The charging port lid 21 has an outer panel 21a disposed on the outside and an inner panel 21b disposed on the inner side the outer panel 21a, as illustrated in FIG. 4.

Figure 6:
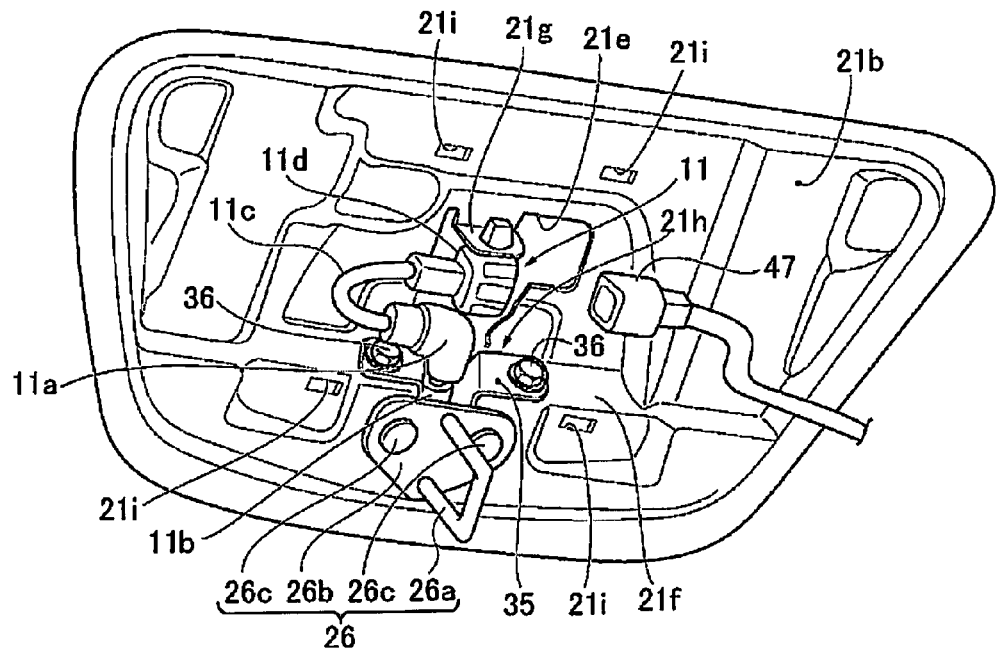
FIG. 6 is an internal perspective view illustrating the inner panel of the charging port lid in which the external charging structure of embodiment 1 is disposed.

The monitor camera 11 has a camera body part 11a, a camera lens part 11b, a camera-side harness 11c, and a camera-side connector 11d, as illustrated in FIGS. 4 and 6. The camera-side harness 11c extends from the camera body part 11a as illustrated in FIG. 6. The camera-side connector 11d is disposed on the leading end of the camera-side harness 11c and connects with a body-side connector 47.

In the installation structure of the monitor camera 11, a lens opening 21c exposing the camera lens part 11b toward the periphery in the front of the vehicle with the optical axis of the lens being oriented diagonally forward and downward is provided on the outer panel 21a of the charging port lid 21, as illustrated in FIG. 4. The camera body part 11a is disposed in a position of a panel space 21d formed by the outer panel 21a and the inner panel 21b, as illustrated in FIG. 4. The structure is furthermore such that the camera body part 11a is fixed to the inner panel 21b to be removable by operation from the rear surface side of the lid in the open state of the charging port lid 21.

The camera body part 11a of the monitor camera 11 is fixed to the inner panel 21b by inserting a bracket 35, to which the monitor camera 11 has been fixed, through the panel opening 21e on the inner panel 21b, and using bolts 36, 36 to securely fasten the bracket 35 to a rear surface-side step part 21f, as illustrated in FIG. 6. Stud nuts (not shown) are fixed in advance by welding on the side opposite the bolts 36, 36.

The camera-side connector 11d of the monitor camera 11 is fixed by inserting and fixing by claw-coupling to a bent part 21g formed by bending a portion of the panel opening 21e of the inner panel 21b of the charging port lid 21, as illustrated in FIG. 6.

Figure 7:
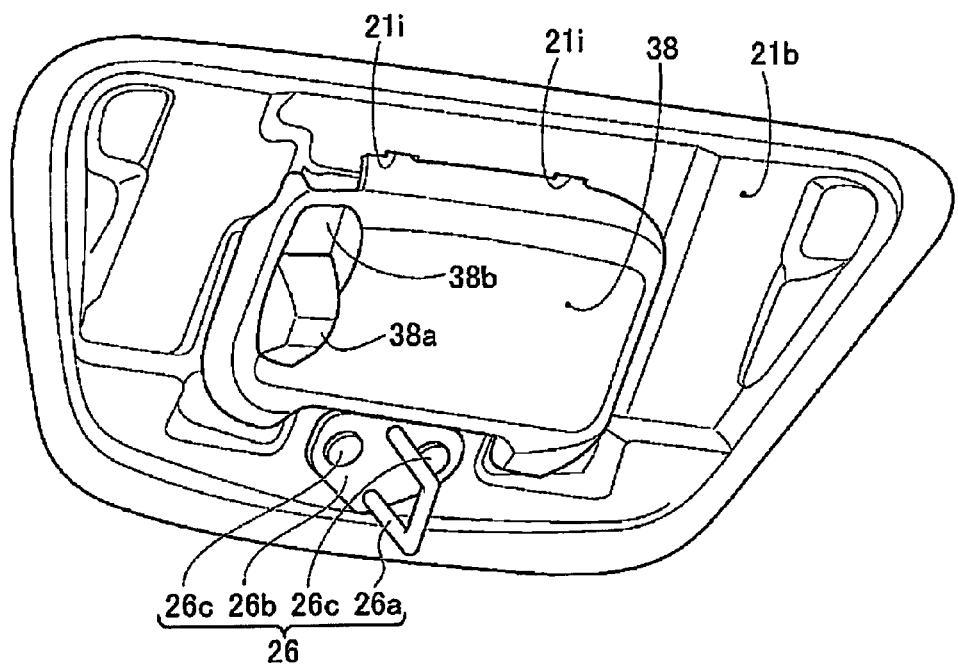
FIG. 7 is an internal perspective view illustrating the inner panel and the camera cover of the charging port lid in which the external charging structure of embodiment 1 is disposed.

A camera cover 38 made of synthetic resin for covering the camera body part 11a and a camera-fixing part 21h for fixing the camera body part 11a is provided on the inner panel 21b, as illustrated in FIG. 7. The camera cover 38 can be attached by being inserted into and caused to engage in four engaging holes 21i from the rear surface side of the lid with the charging port lid 21 open, and can be detached by being pulled so as to disengage.

The camera-fixing part 21h for fixing the camera body part 11a is disposed in the inner panel 21b in a position near the striker 26 fixed to the inner panel 21b, as illustrated in FIG. 6. Here, the striker 26 for locking and coupling to the lid lock mechanism 25 is configured with a striker body part 26a and a striker base part 26b, and the striker base part 26b is fixed by a pair of pins 26c and 26c to the inner panel 21b, as illustrated in FIG. 6.

Figure 5:
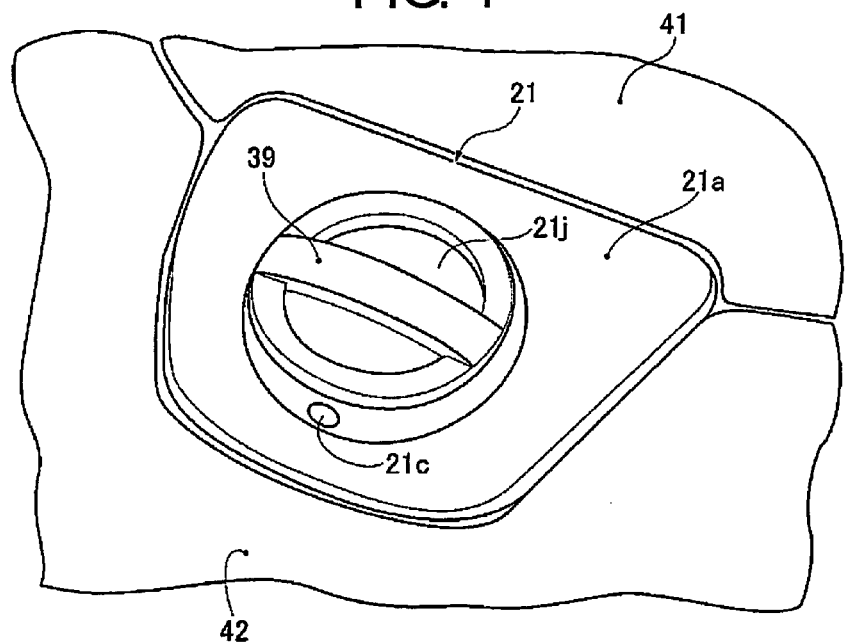
FIG. 5 is an external perspective view illustrating the outer panel of the charging port lid in which the external charging structure of embodiment 1 is disposed.

A projecting part 21j projecting in a circular form toward the outside of the vehicle is formed on the outer panel 21a of the charging port lid 21, as illustrated in FIGS. 4 and 5. An emblem 39 is disposed on the circular upper surface of the projecting part 21j, and the monitor camera 11 is disposed in the position of a space on the rear surface side of the projecting part 21j. The lens opening 21c is circular, the diameter of which being within the range of height of the projecting part 21j, and is formed at the lowest position of the projecting part 21j that is difficult to see from the outside.

Figure 8:
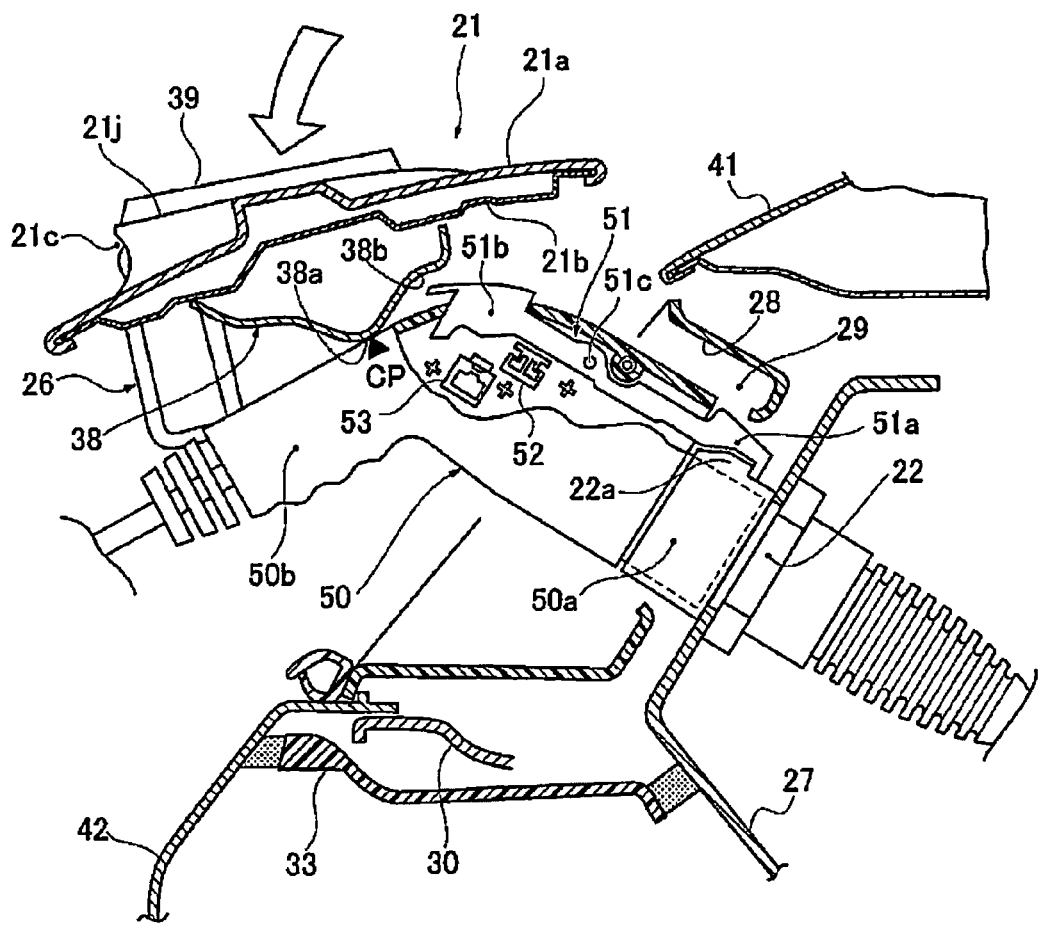
FIG. 8 is a sectional view illustrating the state in which the charging port lid is closed toward the charging gun during charging of the electric vehicle in which the external charging structure of embodiment 1 is disposed.

The external charging structure for an electric vehicle 1 includes the normal charging port 22 (charging port) to which the charging gun 50 is connected when charging the battery pack 5 (vehicle-mounted battery), and with the charging port lid 21, as illustrated in FIG. 8. The charging port lid 21 closes when charging is not occurring, to cover an opening of a port chamber 29 where the normal charging port 22 is disposed (FIG. 4), and opens when charging is occurring to ensure an open space allowing a port connection with the charging gun 50 (FIG. 8).

A charging gun lock mechanism 51 is disposed on the charging gun 50, the charging gun lock mechanism having a locking part 51a for holding a coupling in a position of electrical connection with the normal charging port 22, and an unlocking operation part 51b placed projecting from the surface of the gun and used for unlocking the locking part 51a by a push operation, as illustrated in FIG. 8. The charging gun lock mechanism 51 includes a lever member that rotates centered on a support shaft 51c, the locking part 51a is disposed on the leading end of the lever, and the unlocking operation part 51b is disposed on the rear end of the lever. A lever impelling member 52 and a lever release position switch 53 are disposed on the charging gun 50, as illustrated in FIG. 8. A coupling projection 22a for coupling with the locking part 51a so that the charging gun 50 does not slip out in the position of electrical connection is disposed on the normal charging port 22.

A first-striking part 38a is disposed on the rear surface of the charging port lid 21, the first-striking part coming in contact with a location other than the unlocking operation part 51b ahead of where contact would be made with the unlocking operation part 51b when the charging port lid 21 is closed toward the charging gun 50 during charging, as illustrated in FIG. 8. The unlocking operation part 51b is disposed in a position between a port connection part 50a on the leading end of the charging gun 50 and an operating handle 50b on the rear end. A position of contact CP of the first-striking part 38a to the charging gun 50 is set in a position near the unlocking operation part 51b with the charging gun 50 connected to the port.

The first-striking part 38a is formed integrally projecting on the camera cover 38 for covering the internally held monitor camera 11 from the rear surface of the charging port lid 21, as illustrated in FIG. 7. A recess 38b for avoiding interference with the unlocking operation part 51b is formed on the camera cover 38 in a position adjacent to the first-striking part 38a and in a position corresponding to the unlocking operation part 51b.

The operation is next described.

The operation of the external charging structure for an electric vehicle 1 of embodiment 1 is described under the headings: "Operation of preventing unlocking of charging gun" and "Other operations of external charging structure."

Operation of Preventing Unlocking of the Charging Gun

The charging gun is unlocked by a manual push operation on the unlocking operation part. However, the charging gun may be unlocked unintentionally by pushing of the unlocking operation part by the rear surface of the charging port lid when the charging port lid is closed toward the charging gun during charging. A countermeasure against this unintentional unlocking of the charging gun must be adopted. The operation of preventing unlocking of the charging gun reflecting this need is described below.

A configuration is adopted in embodiment 1, in which the first-striking part 38a is disposed on the rear surface of the charging port lid 21, the first-striking part coming in contact with the location other than the unlocking operation part 51b ahead of where contact would be made with the unlocking operation part 51b when the charging port lid 21 is closed toward the charging gun 50 during charging.

Charging with the charging gun 50 inserted into the normal charging port 22 is generally performed in a state in which the charging port lid 21 is fully open as illustrated in FIG. 2. However, in a rarely encountered case, charging may be performed in a state having closed the fully open charging port lid 21 to cover the upper part of the charging gun 50 by the charging port lid 21 after having inserted the charging gun 50 into the normal charging port 22.

Thus, when an operation to close the charging port lid 21 toward the charging gun 50 is performed during charging with the charging gun 50 connected to the normal charging port 22, the unlocking operation part 51b is pushed by the unlocking operation part 51b and the locking part 51a is released when the lid rear surface comes in contact with the unlocking operation part 51b of the charging gun 50. As a result, in contrast to the expectation of charging, the charging operation using the electrical connection is interrupted from the time of unlocking, and the desired charging is not performed.

In contrast, when the charging port lid 21 is closed toward the charging gun 50 during charging, the first-striking part 38a disposed on the rear surface of the charging port lid 21 comes in contact with the location other than the unlocking operation part 51b ahead of where contact would be made with the unlocking operation part 51b.

Accordingly, the contact of the first-striking part 38a of the charging port lid 21 with the location other than the unlocking operation part 51b is maintained, as illustrated in FIG. 8, even when an operation is performed to close the charging port lid 21 toward the charging gun 50 during charging. Unlocking of the charging gun 50 by pushing of the unlocking operation part 51b by the rear surface of the charging port lid 21 is thereby prevented. As a result, unintentional interruption of the charging operation consequent to unlocking is avoided.

A configuration is thus adopted, in which, as a countermeasure against unlocking by a lid-closing operation during charging, the first-striking part is provided in advance on the rear surface of the charging port lid 21, the first-striking part 38a coming in contact with the location other than the unlocking operation part 51b ahead of where contact would be made with the unlocking operation part 51b. Therefore, unlocking of the charging gun 50 by the charging port lid 21 can be prevented even when the charging port lid 21 is closed toward the charging gun 50 during charging.

Other Operations of External Charging Structure

A configuration is adopted in embodiment 1, in which a position of contact CP by the first-striking part 38a is set in a position near the unlocking operation part 51b with the charging gun 50 connected to the port.

The gun shape of the charging gun 50 is described first. The gun shape has a range of angularity of about 0 to 45 degrees between the port connection part 50a on the front end and the operating handle 50b on the rear end. In other words, there are various kinds of shapes from an unbent straight shape having zero angularity to a maximum bent shape having about 45 degrees angularity as illustrated in FIG. 8.

In this case, the height of projection of the first-striking part 38a must be set higher as the bending angularity is greater in a bent shape compared with a straight shape. As for the position of contact CP made by the first-striking part 38a, when the bending angularity is the same, the height of projection of the first-striking part 38a must be set higher as the position is further from the unlocking operation part 51b.

In contrast, the height to which the first-striking part 38a projects can be kept low regardless of the shape of the charging gun 50, by setting the position of contact CP made by the first-striking part 38a in a position near the unlocking operation part 51b.

A configuration is adopted in embodiment 1, in which the charging port lid 21 internally has a monitor camera 11 for capturing images of the vehicle surroundings, and the first-striking part 38a is formed on a camera cover 38 for covering the monitor camera 11 from a rear surface of the charging port lid 21.

For example, it is imagined that a first-striking member can be added, in addition to the camera cover, when the first-striking part is disposed on the charging port lid internally having the monitor camera. However, in this case, the number of parts is increased by the addition of the first-striking member.

In contrast, the camera cover 38 and the first-striking part 38a can be combined as one part and prevent the number of parts from increasing, by forming the first-striking part 38a on the camera cover 38, which is provided in advance.

The effects are next described.

The effects enumerated below can be obtained with the external charging structure for an electric vehicle 1 of embodiment 1.

(1) An external charging structure for an electric vehicle (electric vehicle 1), the external charging structure comprising a charging port (normal charging port 22) to be connected with a charging gun 50 when charging a vehicle-mounted battery (battery pack 5), and a charging port lid 21 that closes when charging is not occurring to cover an opening of a port chamber 29 where the charging port (normal charging port 22) is disposed and opens when charging is occurring to ensure an open space allowing a port connection with the charging gun 50, wherein:

the charging gun 50 has a locking part 51a for holding a coupling in a position where the charging gun is connected with the charging port (normal charging port 22), and an unlocking operation part 51b placed projecting from a surface of the gun and used for unlocking the locking part 51a by a push operation; and a first-striking part 38a is disposed on a rear surface of the charging port lid 21, the first-striking part coming in contact with a location other than the unlocking operation part 51b ahead of where contact would be made with the unlocking operation part 51b when the charging port lid 21 is closed toward the charging gun 50 during charging (FIG. 8).

A configuration is thus adopted in which the first-striking part 38a is provided in advance on the charging port lid 21, the first-striking part coming in contact with the location other than the unlocking operation part 51b ahead of where contact would be made with the unlocking operation part 51b. Therefore, unlocking of the charging gun 50 by the charging port lid 21 can be prevented even when the charging port lid 21 is closed toward the charging gun 50 during charging.

(2) A position of contact CP made by the first-striking part 38a is set in a position near the unlocking operation part 51b with the charging gun connected to the port 50 (FIG. 8).

Therefore, in addition to the effects of (1), the height of projection of the first-striking part 38a can be kept low regardless of the gun shape of the charging gun 50.

(3) the charging port lid 21 internally has a monitor camera 11 for capturing images of the vehicle surroundings; and the first-striking part 38a is formed on a camera cover 38 for covering the monitor camera 11 from a rear surface of the charging port lid 21 (FIG. 7).

Therefore, in addition to the effects of (1) or (2), the number of parts can be kept low by combining the camera cover 38 and the first-striking part 38a as one part.

Embodiment 2

Embodiment 2 is an example in which the external charging structure is applied to an electric vehicle provided with a charging port lid not internally having a monitor camera.

The configuration is first described.

Figure 9:
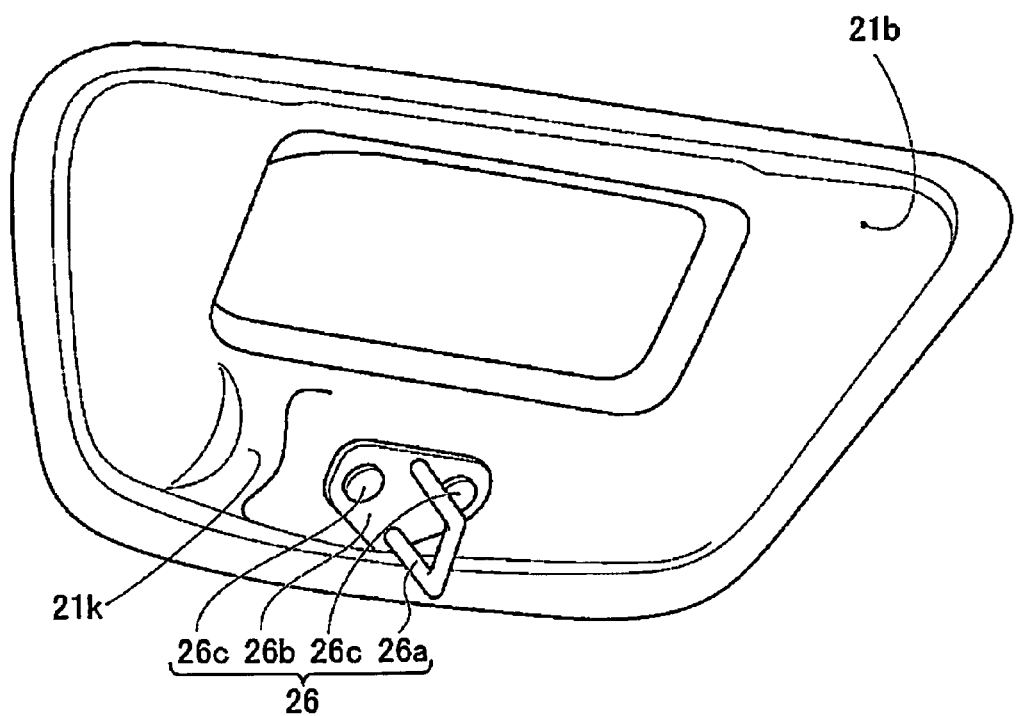
FIG. 9 is an internal perspective view illustrating the inner panel of the charging port lid in which the external charging structure of embodiment 2 is disposed.
Figure 10:
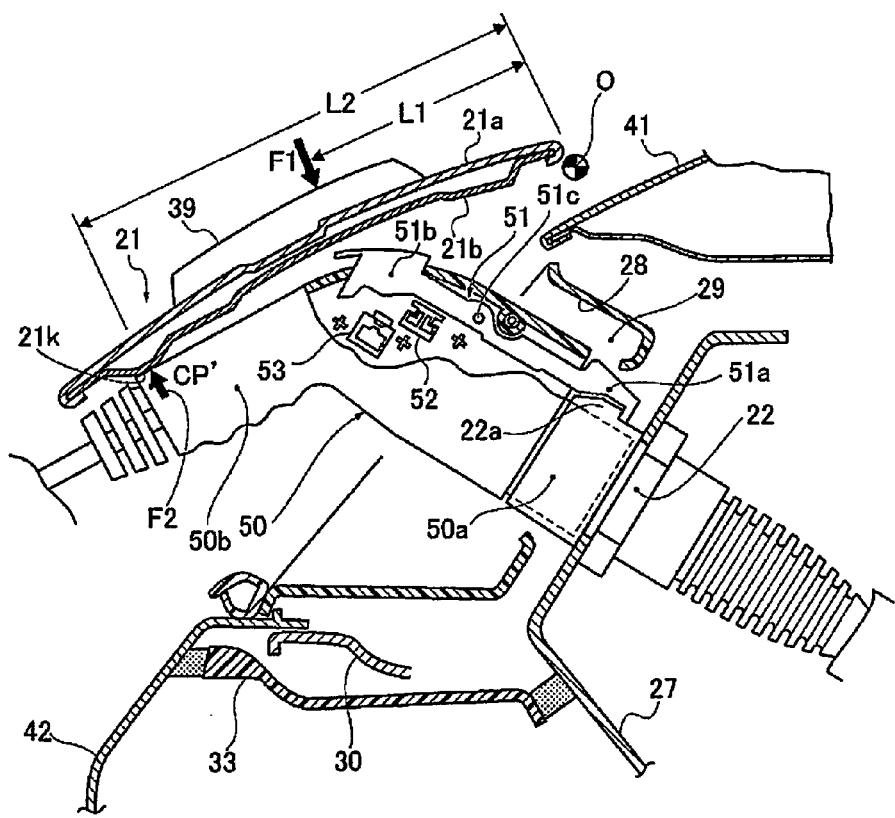
FIG. 10 is a sectional view illustrating the state in which the charging port lid is closed toward the charging gun during charging of the electric vehicle in which the external charging structure of embodiment 2 is disposed.

FIG. 9 illustrates the inner panel of the charging port lid in which the external charging structure of embodiment 2 is provided, and FIG. 10 illustrates the state in which the charging port lid is closed toward the charging gun during charging of the electric vehicle in which the external charging structure of embodiment 2 is disposed. The detailed configuration of the external charging structure of embodiment 2 is described below with reference to FIGS. 9 and 10.

The charging port lid 21 internally has a monitor camera 11 as in embodiment 1, and has an outer panel 21a disposed on the outside of the vehicle, and an inner panel 21b disposed on the inner side the outer panel 21a, as illustrated in FIG. 10. A first-striking part 21k is formed by extending the inner panel 21b toward the inside of the vehicle, as illustrated in FIG. 9.

The unlocking operation part 51b has the same configuration as embodiment 1, and is disposed in a position between the port connection part 50a on the leading end of the charging gun 50 and the operating handle 50b on the rear end, as illustrated in FIG. 10. A position of contact CP' made by the first-striking part 21k is set away from the unlocking operation part 51b with the charging gun 50 connected to the port, and away from the rotational center O (virtual center) of the charging port lid 21 (a position at the rear end of the operating handle 50b). Because the rest of the configuration is the same as in embodiment 1, the same reference symbols are assigned to the corresponding configurations and the descriptions are omitted.

The operation is next described.

A configuration is adopted in embodiment 2, in which the position of contact CP' made by the first-striking part 21k is set away from the unlocking operation part 51b with the charging gun 50 connected to the port, and in a position away from the rotational center O of the charging port lid 21.

The balance relationship of the moment brought about by the position of contact CP' made by the first-striking part 21k is first described. The following formula is established when an external force F1 is applied to the center part of the charging port lid 21, and when F2 is a reaction force at the first-striking part 21k as illustrated in FIG. 10:

$$F1 \cdot L1 = F2 \cdot L2 \quad (1)$$

where L1 is the span from the rotational center O to the external force F1, and L2 is the span from the rotational center O to the reaction force F2.

In the above formula (1), the reaction force F2 becomes smaller as the span L2 becomes longer in F2·L2 on the right side when F1·L1 on the left side is constant.

In contrast, setting the position of contact CP' made by the first-striking part 21k in a position away from the unlocking operation part 51b (rotational center O) ensures that the span L2 is longer and keeps the reaction force F2 (<F1) smaller when the same external force F1 is applied. This reaction force F2, in other words, is a load applied to the charging gun 50, and the load applied to the charging gun 50 is kept smaller by setting the position of contact CP' made by the first-striking part 21k away.

A configuration is adopted in embodiment 2, in which the first-striking part 21k is formed by extending the inner panel 21b of the charging port lid 21 toward the inside of the vehicle.

For example, it is imagined that a first-striking member is added, in addition to the charging port lid, when the first-striking part is provided. However, in this case, the number of parts is increased by the addition of the first-striking member.

In contrast, the inner panel 21b and the first-striking part 21k can be combined as one part and the number of parts can be kept low, by forming the first-striking part 21k on the inner panel 21b, which is a configuration element of the charging port lid 21.

The remainder of the operation is the same as in embodiment 1, for which reason no description thereof is given.

The effects are next described.

The effects given as examples below can be obtained in the external charging structure for an electric vehicle 1 of embodiment 2.

(4) The position of contact CP' made by the first-striking part 21k is set away from the unlocking operation part 51b with the charging gun 50 connected to the port, and in a position away from the rotational center O of the charging port lid 21 (FIG. 10).

Therefore in addition to the effects of (1), the load applied to the charging gun 50 can be kept small when the charging port lid 21 is closed toward the charging gun 50 during charging.

(5) The charging port lid 21 has an outer panel 21a disposed on the outside of the vehicle, and an inner panel 21b disposed on the inner side the outer panel 21a; and the first-striking part 21k is formed by extending the inner panel 21b toward the inside of the vehicle (FIG. 9).

Therefore, in addition to the effects of (1) and (4), the number of parts can be kept low by combining the inner panel 21b and the first-striking part 21k as one part.

The external charging structure for an electric vehicle of the present invention was described above based on embodiment 1 and embodiment 2, but the specific configuration is not provided by way of limitation thereto; changes or additions to the design, etc., are permitted to the extent that there is no deviation from the main point of the invention according to the claims.

Examples are illustrated in embodiments 1 and 2, in which the first-striking part 38a or 21k is provided on the rear surface of the charging port lid 21 opposite the charging gun 50 connected to the normal charging port 22. However, it is also possible to envision an example in which a first-striking part is provided on the rear surface of the charging port lid opposite a charging gun connected to the high-speed charging port, as well as an example in which a first-striking part is provided on the rear surface of the charging port lid opposite each of charging guns connected to the normal charging port and the high-speed charging port.

Examples are illustrated in embodiments 1 and 2, in which the external charging structure is applied to an electric vehicle 1 that travels with a motor as a drive source. However, the vehicle in which the external charging structure is applied is not given by way of limitation; the external charging structure can be applied to a plug-in hybrid vehicle having a motor and an engine as drive sources, and other electric vehicles provided with an external charging source.

The invention claimed is:

1. An external charging structure for an electric vehicle, the external charging structure comprising:
    a charging port configured to connect to a charging gun when a vehicle-mounted battery is charged; and
    a charging port lid configured to close when charging is not occurring so as to cover an opening of a port chamber where the charging port is disposed and to open when charging is occurring to ensure an open space allowing a port connection with the charging gun,
    the charging gun having a locking part configured to hold a coupling in a position where the charging gun is electrically connected with the charging port, and an unlocking operation part placed projecting from a surface of the gun and used for unlocking the locking part by a push operation in a closing direction of the charging port lid; and
    a first-striking part disposed on a rear surface of the charging port lid, the first-striking part coming in contact with a location other than the unlocking operation part ahead of where contact would be made with the unlocking operation part when the charging port lid is closed in a closing direction of the charging port lid.

2. The external charging structure for an electric vehicle according to claim 1, wherein
    a position of contact made by the first-striking part is set in a position near the unlocking operation part when the charging gun is connected to the port.

3. The external charging structure for an electric vehicle according to claim 1, wherein
    a position of contact made by the first-striking part is set away from the unlocking operation part when the charging gun is connected to the port and away from a rotational center of the charging port lid.

4. The external charging structure for an electric vehicle according to claim 1, wherein
    the charging port lid includes a monitor camera configured to capture images of the vehicle surroundings; and
    the first-striking part is formed on a camera cover for covering the monitor camera from a rear surface of the charging port lid.

5. The external charging structure for an electric vehicle according to claim 1, wherein
    the charging port lid has an outer panel disposed outside the vehicle, and an inner panel disposed on the inner side the outer panel; and
    the first-striking part is formed by extending the inner panel toward the inside of the vehicle.

6. The external charging structure for an electric vehicle according to claim 2, wherein
    the charging port lid includes a monitor camera configured to capture images of the vehicle surroundings; and
    the first-striking part is formed on a camera cover for covering the monitor camera from a rear surface of the charging port lid.

7. The external charging structure for an electric vehicle according to claim 3, wherein
    the charging port lid includes a monitor camera configured to capture images of the vehicle surroundings; and
    the first-striking part is formed on a camera cover for covering the monitor camera from a rear surface of the charging port lid.

8. The external charging structure for an electric vehicle according to claim 2, wherein
    the charging port lid has an outer panel disposed outside the vehicle, and an inner panel disposed on the inner side the outer panel; and
    the first-striking part is formed by extending the inner panel toward the inside of the vehicle.

9. The external charging structure for an electric vehicle according to claim 3, wherein
    the charging port lid has an outer panel disposed outside the vehicle, and an inner panel disposed on the inner side the outer panel; and
    the first-striking part is formed by extending the inner panel toward the inside of the vehicle.

10. The external charging structure for an electric vehicle according to claim 1, wherein
    the first-striking part extends toward an inside of the vehicle.

* * * * *